US012789153B2

(12) United States Patent
Latva-Kokko et al.

(10) Patent No.: US 12,789,153 B2
(45) Date of Patent: Nov. 10, 2026

(54) STIRRING IMPELLER, ARRANGEMENT AND USE

(71) Applicant: Metso Finland Oy, Espoo (FI)

(72) Inventors: Marko Latva-Kokko, Pori (FI); Jiliang Xia, Pori (FI); Pekka Immonen, Vantaa (FI)

(73) Assignee: Metso Finland Oy, Espoo (FI)

( * ) Notice: Subject to any disclaimer, the term of this patent is extended or adjusted under 35 U.S.C. 154(b) by 515 days.

(21) Appl. No.: 18/036,330

(22) PCT Filed: Nov. 20, 2020

(86) PCT No.: PCT/FI2020/050785
§ 371 (c)(1),
(2) Date: May 10, 2023

(87) PCT Pub. No.: WO2022/106745
PCT Pub. Date: May 27, 2022

(65) Prior Publication Data
US 2024/0009635 A1 Jan. 11, 2024

(51) Int. Cl.
*B01F 27/1111* (2022.01)
*B01F 27/1152* (2022.01)
(Continued)

(52) U.S. Cl.
CPC ....... *B01F 27/1111* (2022.01); *B01F 27/1152* (2022.01); *B01F 27/851* (2022.01);
(Continued)

(58) Field of Classification Search
CPC .......................... B01F 27/1111; B01F 27/1152
(Continued)

(56) References Cited

U.S. PATENT DOCUMENTS 573,473 A * 12/1896 Millard .................... A01C 7/04 366/196
727,032 A * 5/1903 Tubbs ................... A47J 43/044 366/307
(Continued)

FOREIGN PATENT DOCUMENTS

CN 101480587 A 12/2008
CN 102186572 A 9/2011
(Continued)

OTHER PUBLICATIONS

International Search Report and Written Opinion for International Application No. PCT/FI2020/050785, mailed Jun. 3, 2021.
(Continued)

*Primary Examiner* — David L Sorkin
(74) *Attorney, Agent, or Firm* — Andrus Intellectual Property Law, LLP

(57) ABSTRACT

A stirring impeller, an arrangement, and a use. The impeller comprises a hub disc comprising a shaft attachment structure arranged centrally in the hub for receiving a shaft centrally and perpendicularly from an upper side of the hub disc, a plurality of upper blades arranged on the upper side of the hub disc, and a plurality of lower blades arranged on a lower side of the hub disc. At least one of said plurality of upper blades is arranged to have jet angle of 5°-45°, and the lower blades have a jet angle that is different than said jet angle of least one of said plurality of upper blades.

19 Claims, 3 Drawing Sheets

(51) Int. Cl.
*B01F 27/85* (2022.01)
*B01J 19/00* (2006.01)
*B01J 19/18* (2006.01)

(52) U.S. Cl.
CPC ......... *B01J 19/006* (2013.01); *B01J 19/0066* (2013.01); *B01J 19/18* (2013.01); *B01J 2219/00768* (2013.01); *B01J 2219/00779* (2013.01); *B01J 2219/182* (2013.01)

(58) Field of Classification Search
USPC .................................................. 366/316, 317
See application file for complete search history.

(56) References Cited

U.S. PATENT DOCUMENTS 1,084,210 A * 1/1914 Howard .................. B01F 27/93 366/302
1,304,349 A * 5/1919 Moore .................. B01F 27/115 366/317
3,290,016 A * 12/1966 Lennon ............... B01F 27/1152 416/228
3,343,815 A * 9/1967 Kingma ................... C13K 1/06 366/317
3,376,024 A * 4/1968 Beechler ............. B01F 27/1152 416/237
4,577,975 A * 3/1986 McCrory ................ B01F 27/86 403/14
9,643,336 B1 * 5/2017 Krivohlavek ......... B01F 27/813
2004/0218465 A1 * 11/2004 Arribau ................. B01F 33/502 366/264
2017/0153561 A1 6/2017 Xu
2017/0158356 A1 6/2017 Yuquing
2018/0117551 A1 5/2018 Tamura et al.

FOREIGN PATENT DOCUMENTS

CN 104826745 A 8/2015
CN 105992637 A 10/2016
FI 125546 B 11/2015
KR 102153523 B1 9/2020
WO 2010043762 A1 4/2010
WO 2018076062 A1 5/2018

OTHER PUBLICATIONS

International Preliminary Report on Patentability for International Application No. PCT/FI2020/050785, dated Oct. 31, 2022.
Office Action for corresponding Chinese Patent Application No. 202080107400.6, mailed Jan. 31, 2026.

* cited by examiner

STIRRING IMPELLER, ARRANGEMENT AND USE

CROSS-REFERENCE TO RELATED APPLICATIONS

This application is the U.S. national stage application of International Application PCT/FI2020/050785, filed Nov. 20, 2020, which international application was published on May 27, 2022, as International Publication WO 2022/106745 A1 in the English language.

BACKGROUND

The invention relates to a stirring impeller.

The invention further relates to an arrangement for mixing gas with slurry.

The invention still further relates to a use of the stirring impeller.

Stirring impellers are commonly used in processes for mixing gas with slurry. It has been found out that many impellers have very serious erosion with limited operational period.

BRIEF DESCRIPTION

Viewed from a first aspect, there can be provided a stirring impeller, comprising a hub disc comprising a shaft attachment structure arranged centrally in the hub for receiving a shaft centrally and perpendicularly from an upper side of the hub disc, a plurality of upper blades arranged on the upper side of the hub disc, a plurality of lower blades arranged on a lower side of the hub disc, wherein at least one of said plurality of upper blades is arranged to have jet angle of 5°-45°, and wherein the lower blades have a jet angle that is different than said jet angle of least one of said plurality of upper blades.

Thereby an impeller having an improved particle distribution around impeller surface and more uniform velocity distribution within impeller blade region, and thus having a reduced erosion and an extended operational period may be achieved.

Viewed from a further aspect, there can be provided an arrangement for mixing gas with slurry, comprising a mixing tank, at least one stirring impeller described above arranged in the mixing tank and attached to a shaft, and a motor for rotating the shaft and the stirring impeller.

Thereby an arrangement having a reduced need for maintenance or changing of impeller(s) may be achieved.

The stirring impeller and the arrangement are characterised by what is stated in the independent claims. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

In one embodiment, at least half of the upper blades, preferably all the upper blades, have a jet angle of 5°-45°.

An advantage is that the particle distribution and the velocity distribution may be further improved.

In one embodiment, the jet angle of the upper blade is in range of 10°-40°, preferably 20°-35°.

An advantage is that the particle distribution and the velocity distribution may be improved even more.

In one embodiment, a leading angle of at least one of said plurality of upper blades is in range of 65°-85°, preferably 70°-80°.

An advantage is that a low power consumption of the impeller may be achieved.

In one embodiment, at least half of the upper blades, preferably all the upper blades, have a leading angle of 65°-85°, preferably 70°-80°.

An advantage is that the power consumption of the impeller may be lowered even more.

In one embodiment, the base edge of the upper blade is chamfered and/or curvilinear.

An advantage is that areas of the upper blade that are most vulnerable to erosion may be reduced and thus a longer operational period for the impeller may be achieved.

In one embodiment, the height of the upper blade is 12%-20% of impeller diameter (D).

An advantage is that a low shear stresses and low (highest) total pressures on the impeller surface may be achieved.

In one embodiment, the jet angle of at least one of said plurality of lower blades is in range of −35°-35°, preferably −10°-10°, more preferably 0°.

An advantage is that a high pumping capacity may be achieved.

In one embodiment, at least half of the lower blades, preferably all the lower blades, have a jet angle of −35°-35°, preferably −10°-10°, more preferably 0°.

An advantage is that even higher pumping capacity may be achieved.

In one embodiment, a leading angle of at least one of said plurality of lower blades is in range of 65°-85°, preferably 70°-80°.

An advantage is that a low power consumption of the impeller may be achieved.

In one embodiment, at least half of the lower blades, preferably all the lower blades, have a leading angle of 65°-85°, preferably 70°-80°.

An advantage is that the power consumption of the impeller may be further lowered.

In one embodiment, the leading angle of at least one of said plurality of lower blades, preferably of at least half of the lower blades, more preferably of all the lower blades, is different than the leading angle(s) of the upper blades.

An advantage is that the power consumption of the impeller may be optimized.

In one embodiment, the base edge of the lower blade is curvilinear.

An advantage is that said shape of the base edge may enhance gas dispersing properties of the impeller.

In one embodiment, the height of the lower blade is 20-30% of impeller diameter (D).

An advantage is that the flow near the walls of the mixing tank may be enhanced.

In one embodiment, the hub disc around the shaft attachment structure has a uniform thickness.

An advantage is that the hub disc is more practical to manufacture from a single sheet material.

In one embodiment, the total height of the impeller is in a range of 35-50% of impeller diameter.

An advantage is that low shear stresses and low total pressures on the impeller surface may be achieved.

In one embodiment, the length of the blade is in a range of 50-60% of impeller radius.

An advantage is that the power consumption of the impeller may be optimized.

In one embodiment, the number of upper blades is equal with number of lower blades.

An advantage is that a balance of the impeller may be improved.

In one embodiment, the arrangement comprises an autoclave.

An advantage is that the impeller may be used in processes where elevated temperature and pressure are required, such as pressure oxidation (POX) process to leach various sulfidic minerals containing iron, nickel, cobalt, zinc or copper.

BRIEF DESCRIPTION OF FIGURES

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figure 1:
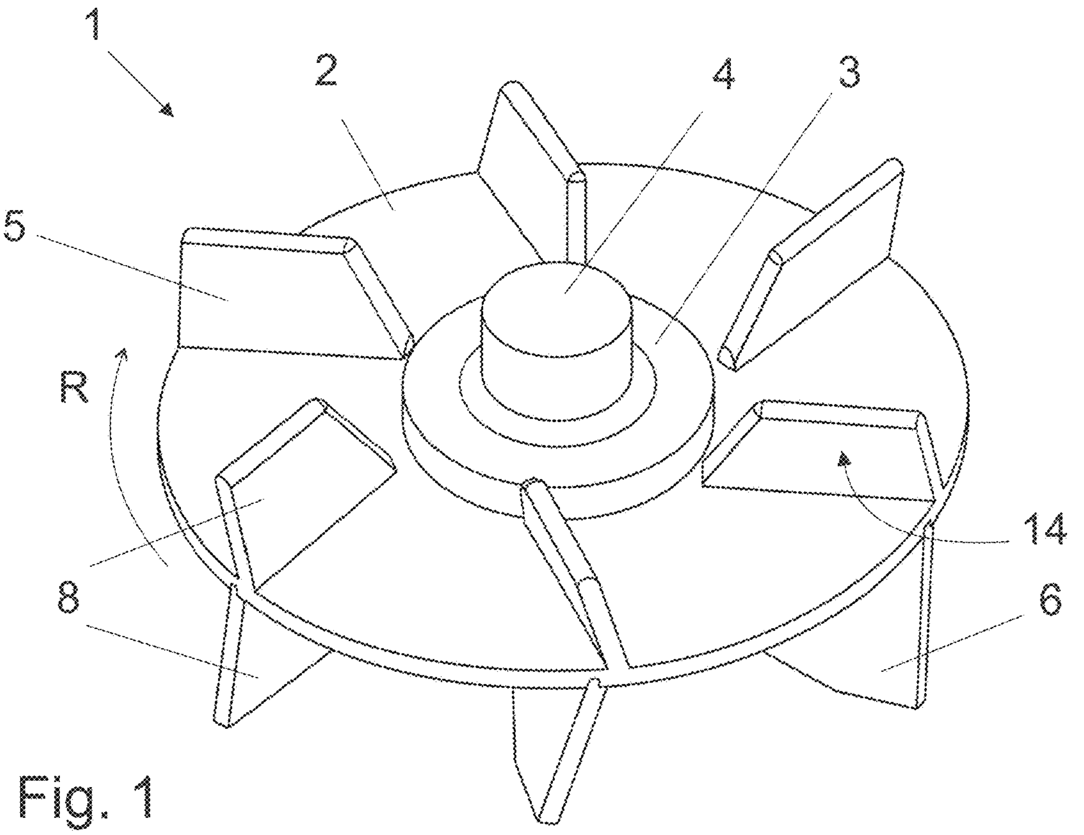
FIG. 1 is a schematic perspective view of a stirring impeller.
Figure 2:
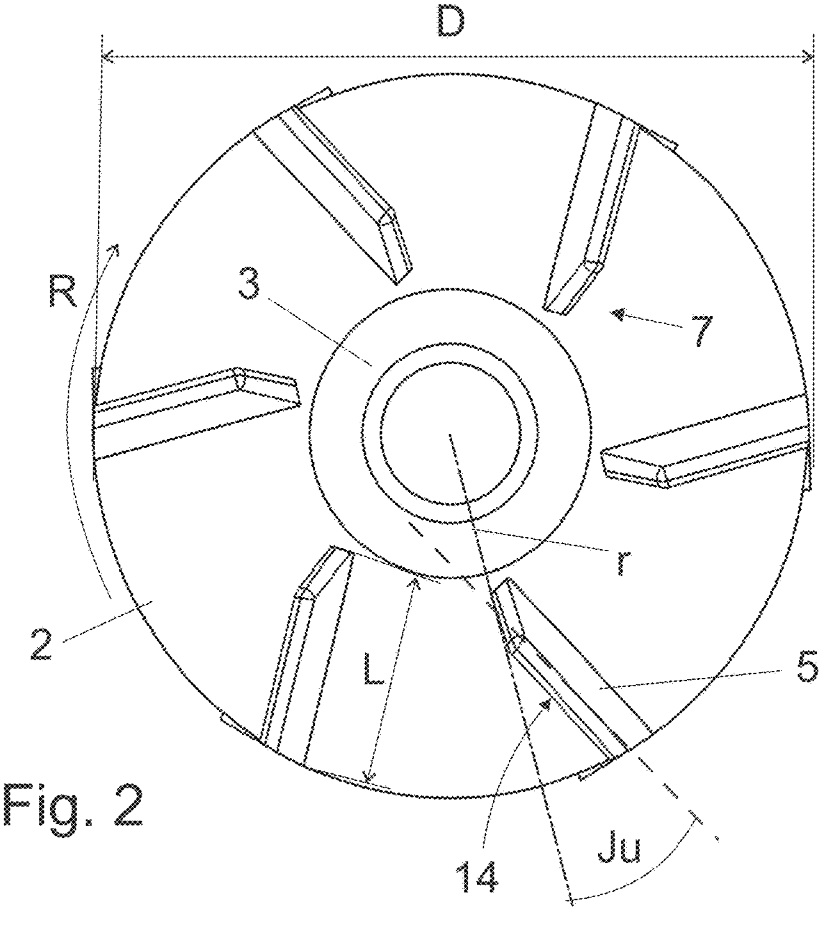
FIG. 2 is a schematic top view of the stirring impeller shown in FIG. 1.
Figure 3:
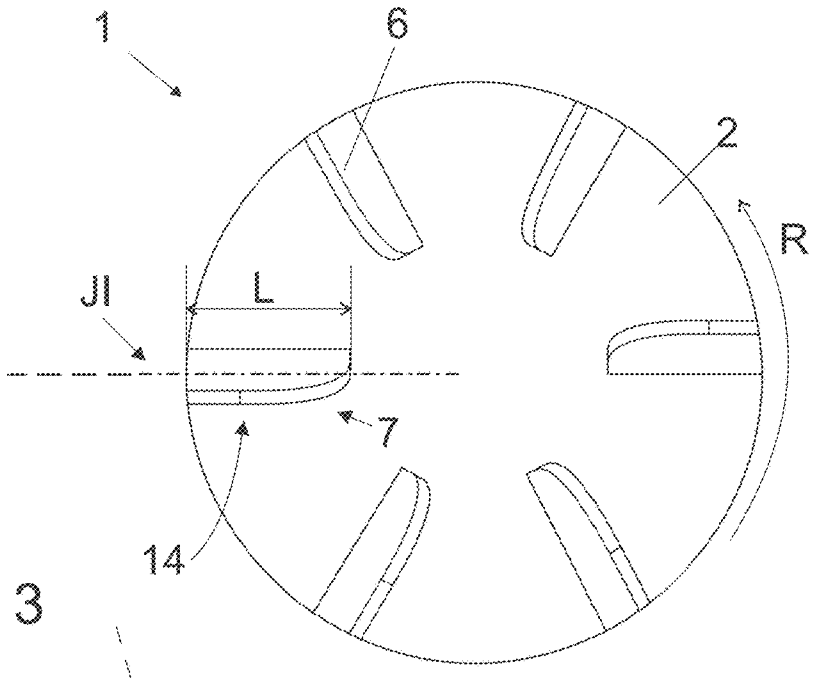
FIG. 3 is a schematic bottom view of the stirring impeller shown in FIG. 1.
Figure 4:
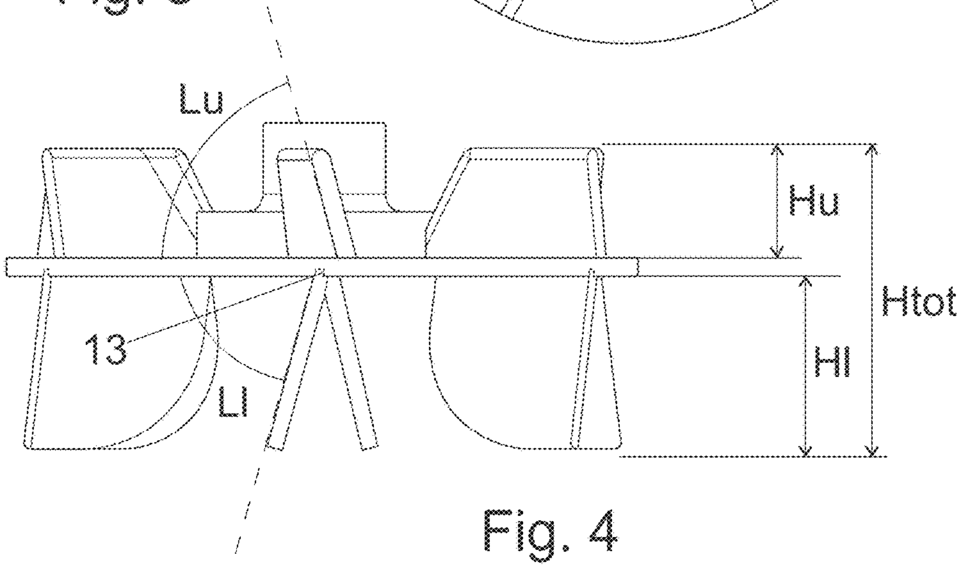
FIG. 4 is a schematic side view of the stirring impeller shown in FIG. 1.

FIG. 1 is a schematic perspective view of a stirring impeller, FIG. 2 is a schematic top view of the stirring impeller shown in FIG. 1, FIG. 3 is a schematic bottom view of the stirring impeller shown in FIG. 1, and FIG. 4 is a schematic side view of the stirring impeller shown in FIG. 1.

The stirring impeller 1 comprises a hub disc 2 that comprises a shaft attachment structure 3 arranged centrally in the hub disc for receiving a shaft 4 centrally and perpendicularly from an upper side of the hub disc 2. It is to be noted that only a part of the shaft is shown in Figures. The shaft 4 may be attached to the attachment structure 3 by e.g. attachment means, such as bolts, or by welding etc. The impeller 1 may be attached to the shaft 4 detachably, i.e. the impeller can be replaced by a new one without changing the shaft 4. In another embodiment, the impeller 1 is attached to the shaft 4 undetachably, i.e. the impeller and the shaft 4 are replaced as an integrated unit. Rotation direction of the impeller 1 is shown by arrow R.

The impeller 1 comprises a plurality of upper blades 5 arranged on the upper side of the hub disc 2, and a plurality of lower blades 6 arranged on a lower side of the hub disc 2.

The impeller 1 is made of metal material, such as steel or titanium alloy. In some embodiments, the impeller 1 or at least some surface sections thereof, comprises a coating. Preferably the blades 5, 6 and the hub disc 2 are manufactured from a sheet material.

The blade 5, 6 is typically manufactured separately and attached to the hub disc 2 by e.g. welding. In an embodiment, a groove 13 (shown in FIG. 4) may be provided in the hub disc 2 in which the blade is arranged and the attached thereto by e.g. welding. The blade 5, 6 may comprise a tongue that is arranged in the groove (as shown in FIG. 4), or alternatively the groove has a width corresponding to width of the blade. In still further embodiment, a mortise and tenon joint is utilized in attachment of the blade to the hub disc.

At least one of said plurality of upper blades 5 has a jet angle Ju of 5°-45°. The meaning of the jet angle (the upper jet angle Ju shown in FIG. 2 and a lower jet angle Jl shown in FIG. 3) in this description is angle between radius r of the hub disc crossing the intersection of the hub disc 2 and a leading surface 14 of the blade at the base edge 7, and the direction of an intersection between a leading surface of the blade and the hub disc.

Positive jet angle means that during rotation R of the impeller, the inner edge of a blade crosses a radius r of the impeller prior to the outer edge of said blade.

In one embodiment, the jet angle Ju of upper blade 5 is in range of 10°-40°.

In one embodiment, the jet angle Ju of upper blade 5 is in range of 20°-35°.

In one embodiment, at least half of the upper blades 5, preferably all the upper blades, have jet angle Ju of 5°-45°, for instance in range of 10°-40°.

In one embodiment, at least half of the upper blades 5, preferably all the upper blades, have jet angle Ju of 20°-35°.

In the embodiment shown in Figures, all the upper blades 5 have jet angle Ju in range of 5°-45°, more accurately about 25°.

In one embodiment, a leading angle Lu (shown in FIG. 4) of at least one of said plurality of upper blades 5 is in range of 65°-85°, for instance in range of 70°-80°. In the embodiment shown in Figures, all the upper blades 5 have leading angle Lu in said range, more accurately about 75°.

The meaning of the leading angle in this description is angle between the hub disc 2 and a leading surface of the blade.

The lower blades 6 have a jet angle Jl that is different than said jet angle Ju of the upper blades. In one embodiment, the jet angle Jl of lower blade 6 is selected in range of −35°-35°.

In one embodiment, the jet angle Jl of lower blade 6 is selected in range of −10°-10°.

In one embodiment, such as shown in Figures, the jet angle Jl of the lower blades is 0°.

In one embodiment, a leading angle Ll of at least one, such as at least half, even all, of the lower blades 6 of the lower blades 6 is in range of 65°-85°, for instance in range of 70°-80°. In one embodiment, such as shown in Figures, the leading angle Ll of the lower blades is 75°.

In one embodiment, the leading angle Ll of at least one of the lower blades is different than the leading angle(s) Lu of the upper blades.

In one embodiment, the leading angle Ll of at least half of the lower blades, is different than the leading angle(s) Lu of the upper blades.

In one embodiment, the leading angle Ll of all the lower blades is different than the leading angle(s) Lu of the upper blades.

The shape of the upper and the lower blades 5, 6 may vary. For instance, the base edge 7 of the blade 5, 6 may be chamfered or curvilinear or a combination of chamfered and curvilinear shape. In one embodiment, all the upper blades 5 have a similar shape. In one embodiment, all the lower blades 6 have a similar shape. However, said similarity is not always necessary.

In one embodiment, such as shown in Figures, the upper blade 5 has a chamfered base edge, whereas the lower blade 6 has a curvilinear shape. The blade may be solid, but it also may comprise at least one hole through which fluid can flow.

In one embodiment, height Hu of the upper blade is 12-20% of impeller diameter D.

In one embodiment, height Hl of the lower blade 6 is 20-30% of impeller diameter D.

In one embodiment, the hub disc 2 around the shaft attachment structure 3 has a uniform thickness. The hub disc 2 is preferably made of a single sheet of metal. However, in some embodiments, the hub disc 2 may have a variable thickness, for instance the thickness may increased from the outer edge towards the shaft attachment structure 3. In one embodiment, the thickness at the shaft attachment structure 3 is 30%-50% more than at the outer edge.

The hub disc 2 may have a round shape, such as shown in Figures. In one embodiment, the disc 2 has a polygonal shape, for instance so that the outer edge of the disc 2 is straight between two blades.

The impeller diameter is typically in range of 500 mm-3000 mm. In one embodiment, such as shown in Figures, the impeller diameter D is at least substantially equal with the diameter of the hub disc 2, since the outer edges 8 of the blades 5, 6 end at the outer edge of the hub disc 2. It is to be noted, however, that in another embodiment at least some of the blades may extend over the outer edge of the hub disc 2. In still another embodiment, at least some of the blades 5, 6 do not extend to the outer edge of the hub disc 2.

In one embodiment, a total height Htot (shown in FIG. 4) of the impeller is in a range of 35-50% of impeller diameter (D).

In one embodiment, the length L of the blade is in a range of 50-60% of impeller radius. Said length L is measured at the intersection of the blade and the hub disc 2.

In one embodiment, such as shown in Figures, number of upper blades 5 is equal with number of lower blades 6. In another embodiment, the number of upper blades 5 is higher than the number of lower blades 6. In still another embodiment, the number of upper blades 5 is lower than the number of lower blades 6. There may be an even number or odd number of blades.

In one embodiment, such as shown in Figures, the lower blades 6 are aligned at least substantially with the upper blades 5. However, this is not always necessary. Thus, in another embodiment the blades are out of alignment.

Figure 5:
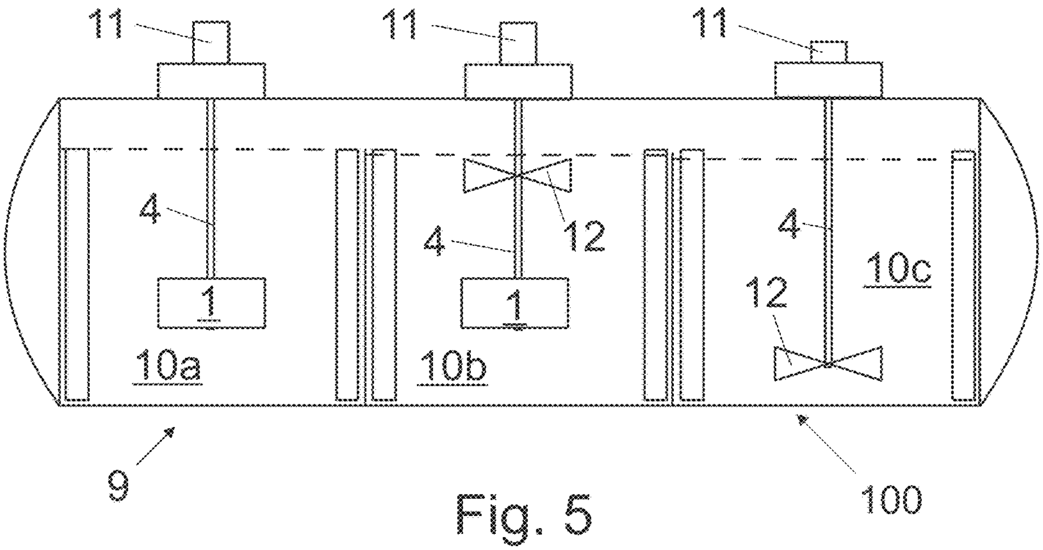
FIG. 5 is a schematic side view of a mixing arrangement in partial cross-section.

FIG. 5 is a schematic side view of a mixing arrangement 100 in partial cross-section.

The arrangement 100 comprises a mixing tank 9, such as an autoclave, and stirring impeller(s) 1 described in this description arranged in the mixing tank 9 and attached to a shaft 4.

The arrangement 100 shown in FIG. 5 comprises three compartments 10. First of the compartments 10*a* is provided with one stirring impeller 1 described in this description. Second compartment 10*b* is provided with two stirring impellers attached to a very same shaft 4. One of said impellers is the type of impeller 1 described in this description, whereas another impeller 12 is of another type of impeller, that differs from the impeller 1. Third compartment 10*c* shown in FIG. 5 comprises just an impeller 12, that differs from the impellers 1 described in this description. Thus, all the impellers included in the arrangement 100 need not to be of type described in this description.

The impellers 1, 12 are arranged to be rotated by a motor 11, such as an electric motor.

It is to be note that the arrangement 100 may vary many ways. For instance, the number of the compartment may be one, two or more than three. There may be two or more stirring impeller(s) 1 arranged in two or more shafts 4 in one compartment.

In one embodiment, the autoclave 9 is arranged for pressure oxidation of a slurried material. The slurried material may comprise e.g. at least one sulfide material.

In one embodiment, the stirring impeller 1 and the arrangement 100 is used for mixing gas in slurry. In one embodiment, said slurry has a particle concentration in a range of 10 wt % to 60 wt %.

In one embodiment, the stirring impeller 1 and the arrangement 100 is used for leaching sulfidic material containing iron.

In one embodiment, the stirring impeller 1 and the arrangement 100 is used for leaching sulfidic material containing nickel.

In one embodiment, the stirring impeller 1 and the arrangement 100 is used for leaching sulfidic material containing cobalt.

In one embodiment, the stirring impeller 1 and the arrangement 100 is used for leaching sulfidic material containing zinc.

In one embodiment, the stirring impeller 1 and the arrangement 100 is used for leaching sulfidic material containing copper.

Figure 6:
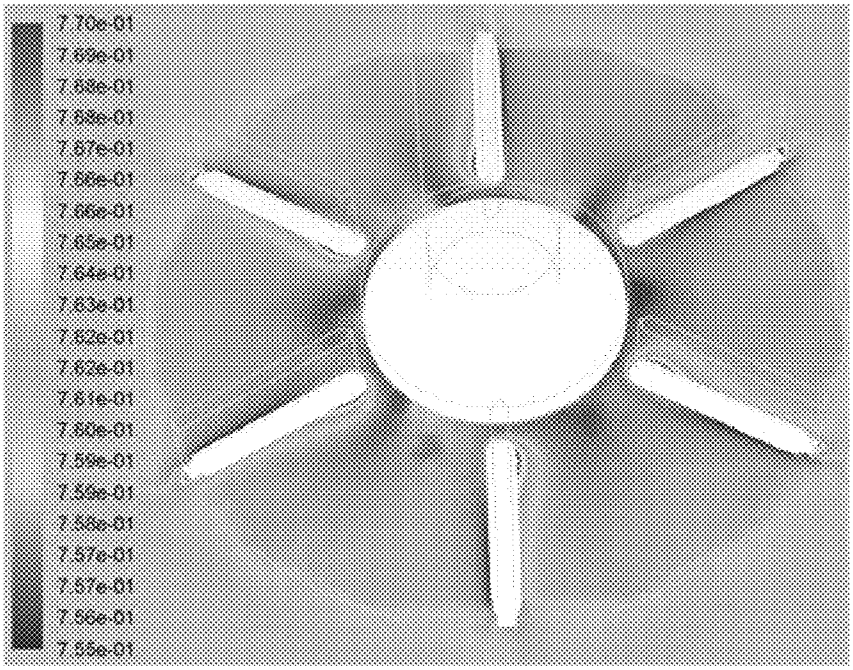
Fig. 6 (prior art)
FIG. 6 illustrates flow pattern of a prior art stirring impeller.
Figure 7:
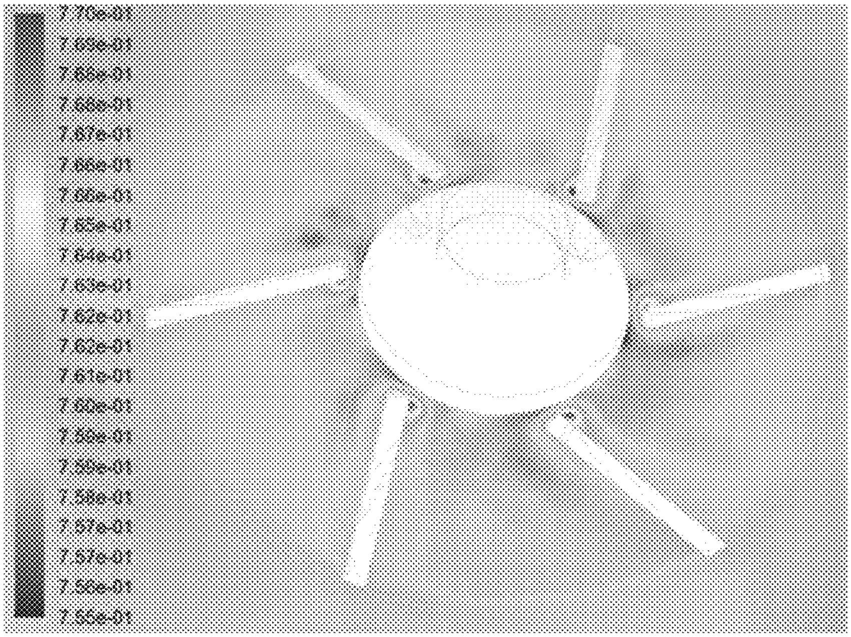
FIG. 7 illustrates flow pattern of a disclosed stirring impeller.

FIG. 6 illustrates flow pattern of a prior art stirring impeller, and FIG. 7 illustrates flow pattern of a disclosed stirring impeller. The darker the flow, the higher particle concentration. It can be readily seen that the particle concentration near the impeller surface is clearly lowered with the new impeller compared to the prior art impeller.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS

1 stirring impeller
2 hub disc
3 shaft attachment structure
4 shaft
5 upper blade
6 lower blade
7 base edge
8 outer edge
9 mixing tank
10 compartment
11 motor
12 second type impeller
13 groove
14 leading surface
100 arrangement D impeller diameter
Hu upper height
Hl lower height
Htot total height
Ju upper jet angle
Jl lower jet angle
L length of blade
Lu upper leading angle
Ll lower leading angle
R direction of rotation
r radius

We claim:

1. A stirring impeller configured for rotation in a direction of rotation, comprising:

a hub disc comprising a shaft attachment structure arranged centrally in the hub disc for receiving a shaft centrally and perpendicularly from an upper side of the hub disc, a plurality of upper blades arranged on the upper side of the hub disc, each of the plurality of upper blades having a leading angle measured between the hub disc and a leading edge of the upper blade in the direction of rotation that is less than 90°, a plurality of lower blades arranged on a lower side of the hub disc, wherein at least one of said plurality of upper blades is arranged to have an upper jet angle of 5°-45° relative to the direction of rotation, and wherein the lower blades have a lower jet angle relative to the direction of rotation that is different than said upper jet angle of least one of said plurality of upper blades.

2. The stirring impeller as claimed in claim 1, wherein at least half of the upper blades have the upper jet angle of 5°-45°.

3. The stirring impeller as claimed in claim 1, wherein said upper jet angle of the at least one of said upper blades is in range of 10°-40°.

4. The stirring impeller as claimed in claim 1, wherein a leading angle of at least one of said plurality of upper blades is in range of 65°-85°.

5. The stirring impeller as claimed in claim 1, wherein at least half of the upper blades have a leading angle of 65°-85°.

6. The stirring impeller as claimed in claim 1, wherein a base edge of the upper blade is chamfered and/or curvilinear.

7. The stirring impeller as claimed in claim 1, wherein the height of the upper blade is 12-20% of an impeller diameter.

8. The stirring impeller as claimed in claim 1, wherein the lower jet angle of at least one of said plurality of lower blades is in range of −35°-35°.

9. The stirring impeller as claimed in claim 1, wherein at least half of the lower blades, have the lower jet angle of −35°-35°.

10. The stirring impeller as claimed in claim 1, wherein a leading angle of at least one of said plurality of lower blades is in range of 65°-85°.

11. The stirring impeller as claimed in claim 1, wherein at least half of the lower blades have a leading angle of 65°-85°.

12. The stirring impeller as claimed in claim 1, wherein a leading angle of at least one of said plurality of lower blades is different than a leading angle(s) of the upper blades.

13. The stirring impeller as claimed in claim 1, wherein a base edge of the lower blade is curvilinear.

14. The stirring impeller as claimed in claim 1, wherein a height of the lower blade is 20-30% of an impeller diameter.

15. The stirring impeller as claimed in claim 1, wherein the hub disc around the shaft attachment structure has a uniform thickness.

16. The stirring impeller as claimed in claim 1, wherein a total height of the impeller is in a range of 35-50% of impeller diameter.

17. The stirring impeller as claimed in claim 1, wherein a length of the blade is in a range of 50-60% of an impeller radius.

18. The stirring impeller as claimed in claim 1, wherein the number of upper blades is equal with number of lower blades.

19. The stirring impeller as claimed in claim 1, wherein an impeller diameter is at least substantially equal with a diameter of the hub disc.

* * * * *